United States Patent [19]

Mizuno

[11] 4,373,112

[45] Feb. 8, 1983

[54] CABLE HOLDER

[75] Inventor: Akira Mizuno, Fujisawa, Japan

[73] Assignee: Nikko Kogyo Kabushiki Kaisha, Tokyo, Japan

[21] Appl. No.: 235,161

[22] Filed: Feb. 13, 1981

[51] Int. Cl.³ .............................................. H02G 3/18
[52] U.S. Cl. .............................. 174/65 R; 174/153 G; 248/56
[58] Field of Search ............... 174/65 R, 65 SS, 65 G, 174/135, 40 CC, 151, 152 R, 153 R, 153 G; 339/103 R, 103 B, 103 C, 107; 248/56, 74 PB, 74 B

[56] References Cited

U.S. PATENT DOCUMENTS

| 2,331,258 | 10/1943 | White et al. | 174/40 CC |
| 2,421,443 | 6/1947 | Torresen | 174/40 CC X |
| 3,495,028 | 2/1970 | Tutthill | 174/153 R |
| 3,609,214 | 9/1971 | Totsuka | 174/65 R |

FOREIGN PATENT DOCUMENTS

| 2517826 | 11/1975 | Fed. Rep. of Germany | 174/65 SS |
| 1080628 | 6/1954 | France | 174/65 R |
| 396135 | 1/1966 | Switzerland | 174/65 G |

Primary Examiner—A. T. Grimley
Assistant Examiner—D. A. Tone
Attorney, Agent, or Firm—Martin Smolowitz

[57] ABSTRACT

A cable holder being attachable through a hole of a box plate of a panel board box, using a mounting body into which an insertable resilient member can be slid. The insertable member also is provided with an axial through hole in which a cable is inserted. The insertable member, holding the cable through the hole, is inserted into the hollow cylinder of the body and clamped around the body to thereby hold the cable in the cable holder.

3 Claims, 7 Drawing Figures

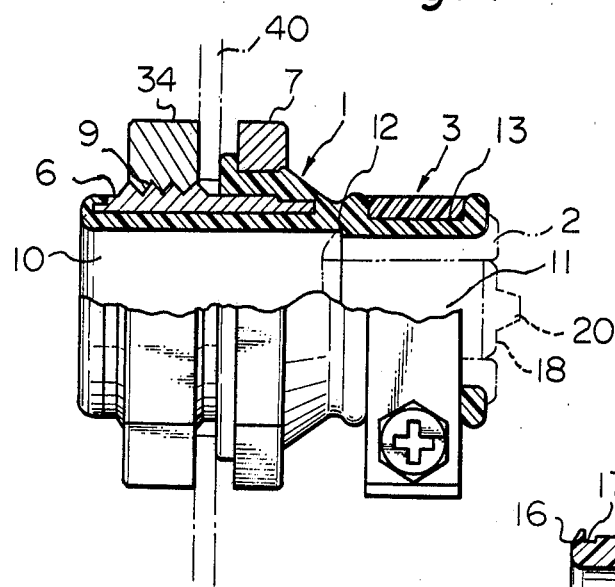
Fig. 1
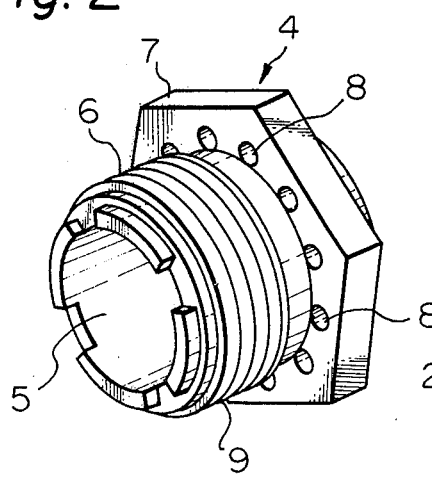
Fig. 2
Fig. 3
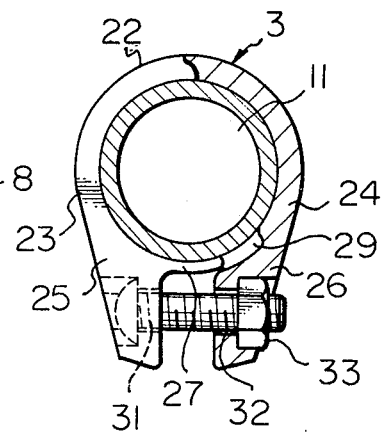
Fig. 4

CABLE HOLDER

BACKGROUND OF THE INVENTION

This invention relates to a cable holder, and more particularly, to a cable holder that is attached to a hole in the box plate of a distribution switchboard, a panel board and the like for holding a cable inserted in the box through the hole.

Many cable holders have been developed as means for holding a cable at a hole that is made in the box plate of a distribution switchboard and through which the cable is inserted in the board. The simplest form of these holders is a ring with an eyelet that is made of an electrically insulating, resilient material and which has an inside diameter equal or suitable to the cable diameter. The ring is attached to a hole in the box plate of a distribution board box and the cable is inserted into the box through the eyelet. The ring provided electrical insulation between the cable and the box plate without damaging the outer insulating coating of the cable, but with this ring, the cable is not always held securely. Most distribution boxes are supplied with cables of different sizes. Several cable holders are known that are adapted to various sizes of cable and which are attached to a hole in a distribution board box by, say, a locknut for securely and mechanically holding cable of any size with electrical insulation being provided between the holder and cable. One example of the holder of this type is integrally formed of a plurality of hollow cylinder elements in an array and each of the holes of the cylinder elements is axially aligned with each other. The inside diameter of each element stepwisely shortens toward the tip and the outside diameter thereof also shortens correspondingly. To insert a cable into the holder, such an integrated cylinder, the part of the cylinder elements that has an inside diameter shorter than the outside diameter of the cable to be inserted, is cut off. The cable is inserted into the cylinder element of a suitable inside diameter through the common hole of the resulting cylinder and is clamped from the outside of the cylinder element. With this type of holder, the cylinder element need not be cut off if the cable to be held has an outside diameter equal or approximate to the smallest inside diameter of the element. However, if the cable has a greater outside diameter, the need of cutting off the unnecessary part of the cylinder element increases the labor on the job site. Among the many cylinder elements that comprise the holder of this type, the cable is effectively held by only the cylinder element which is adapted to the cable diameter. Therefore, the nature of manufacture does not permit step wise arranged cylinder elements with a great axial length to be produced and the integrated cylinder only has a short length of one of the elements to effectively hold the cable. But then, the cable is easily damaged because, to get a secure grip, the cable must be placed under great stress in a small area of the element. Otherwise, not only is the cable not securely held by the holder but also, because of the shortness of the effective area of the cylinder element, the smallest gap in the holding section permits external air or moisture to enter the panel board box.

SUMMARY OF THE INVENTION

This invention provides a cable holder which is free of the defects of the prior art products. The holder of this invention comprises a mounting body with a hollow cylinder which is to be mounted on a hole in the box plate of a distribution board box and through which a cable is inserted, an insertable member that can be slid into the mounting body, and a clamper for clamping the insertable member via the mounting body. The insertable member, when slid into the hollow cylinder of the mounting body, is in temporary engagement with the cylinder so that it will not be pushed back immediately, and the clamper holds the length of the insertable member in place by clamping the outer periphery of the mounting body.

It is therefore one object of this invention to provide a cable holder that is capable of holding cables of various sizes without changing the mounting body but which uses an insertable member having an inside diameter which is equal to or approximates the diameter of the cable to be inserted.

Another object of this invention is to provide a cable holder that has a relatively large effective length to securely hold the cable in the mounting body with or without an insertable member and which hence does not damage the part of the cable inserted in the holder.

A further object of this invention is to provide a cable holder that has a relatively large effective length to hold the cable in the mounting body and which hence does not permit surrounding air or moisture to enter the panel board box through the cable-receiving end of the holder.

Still another object of this invention is provide a cable holder that can be attached to a panel board box without letting surrounding air enter the box because when not used, the holder is fitted with a removable cap on the cable-receiving mouth of the insertable member.

These objects of this invention can be achieved by a cable holder which comprises a mounting body with a hollow cylinder that is to be mounted on a hole in the plate of a panel board box and through which a cable is inserted, an insertable member that can be slid into the mounting body, and a clamper for clamping the insertable member via the mounting body. The inside diameter of the hollow cylinder is such that the size of the area that receives the insertable member is smaller than the size of the other area, thus forming a step on the boundary of the two areas. The insertable member has an outside diameter substantially equal to the inside diameter of the smaller part of the hollow cylinder. A flange is formed on one end of the hollow cylinder, and on the other end, a ring and an inwardly adjacent annular groove are formed, the ring having an outside diameter substantially equal to the inside diameter of the larger part of the hollow cylinder. The clamper is positioned around that part of the mounting body which receives the insertable member and it clamps the body from outside. The clamper is in the form of a U-shaped belt having legs that form a longitudinal extension of the respective wings. The legs are clamped with a clamping bolt to urge the U-shaped belt against the outer periphery of the mounting body. One belt wing has a tongue at the root of the leg to define the inner peripheral extension of the wing, and the other belt wing has a recess formed at the root of the leg for receiving the tongue. Because of this arrangement, when the mounting body is clamped with the clamper, the U-shaped belt combines with the tongue to surround the entire periphery of the mounting body, and no part of the contracting body will bulge out of the circumference formed by the belt.

These and other objects of this invention will be apparent from the following description of a preferred embodiment by reference to the accompanying drawings.

BRIEF DESCRIPTION OF THE DRAWINGS

FIG. 1 is an elevation showing, in partial longitudinal section, a cable holder in a preferred embodiment of this invention;

FIG. 2 is a perspective view showing the rigid portion of the mounting body of the cable holder of FIG. 1;

FIG. 3 is an elevation showing, in partial section, the insertable member of the cable holder of FIG. 1;

FIG. 4 is an end view showing, in partial section, the mounting body of the cable holder of FIG. 1;

DETAILED DESCRIPTION OF THE PREFERRED EMBODIMENTS

Figure 5:
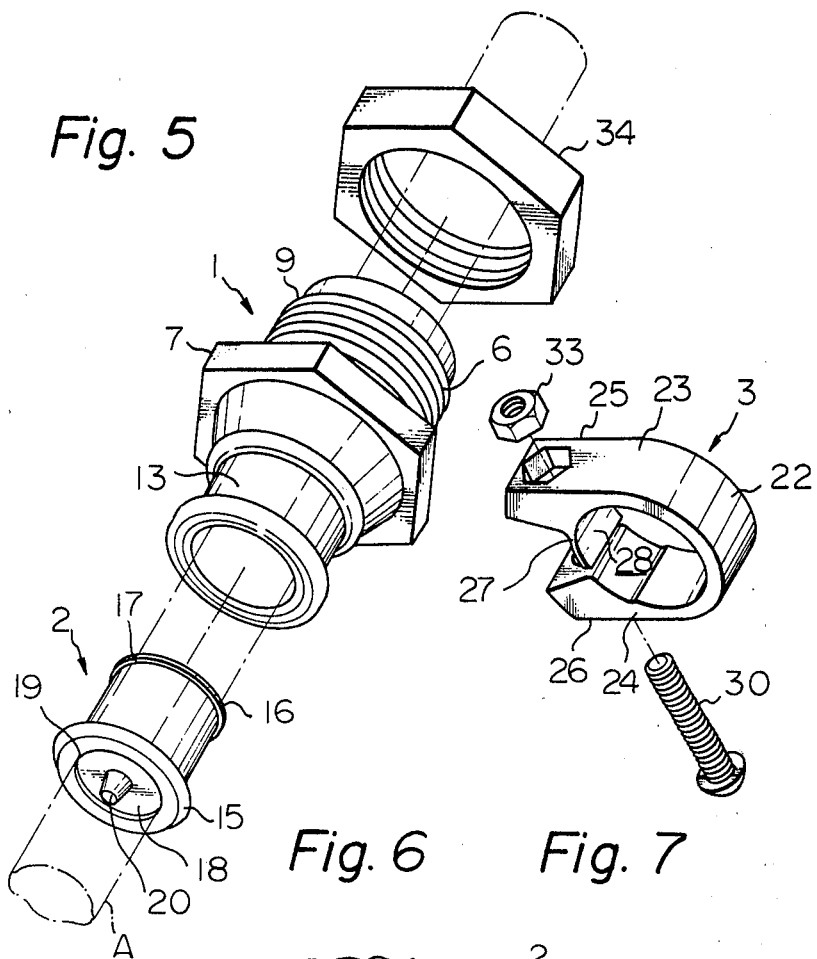
FIG. 5 is an exploded perspective view of a cable holder of this invention.

As described above, the cable holder of this invention comprises a mounting body 1, an insertable member 2, and a clamper 3. The mounting body 1 comprises a core member of a rigid element 4 made of metal or rigid plastic such as polycarbonate resin, that is integrally molded with an electrically insulating, resilient plastic material such as flexible rubber or vinyl chloride resin. The rigid element 4 is formed of a tube 6 having through-hole 5 and a collar 7 in the middle of the tube. A plurality of holes 8 are made in the collar 7 to surround the tube 6. In a molding process, the resilient plastic material flows through the holes 8 and makes an integrated combination with the rigid element 4 on both sides of the collar 7. The integrated molded body or mounting body 1 is covered with the resilient plastic material except for the greater part of the collar 7 and that part of tube 6 which is provided with a male thread 9 thereon. The resilient plastic material on the inner surface of the threaded part of the tube 6 forms a hollow cylinder 10 which extends beyond the collar 7 to form another cylinder 11. The inside diameter of the cylinder 11 is substantially equal to the outside diameter of the insertable member 2 which is to be described hereunder, and the inside diameter of the cylinder 10 is larger than that of the cylinder 11, thereby forming a step 12 on the boundary between the two cylinders. The length of the cylinder 11 is substantially equal to the axial length of the smaller part of the insertable member 2. The outer periphery of the mounting body having the cylinder 11 is provided with an annular groove 13 around which the clamper 3 to be described hereunder is attached. The insertable member 2 is a hollow cylinder made of an electrically insulating, resilient plastic material, and it has a flange 15 on one end and a ring 16 and an inwardly adjacent annular groove 17 on the other end. As mentioned before, the outside diameter of the insertable member 2 is substantially equal to the inside diameter of the hollow cylinder 11, and the outside diameter of the ring 16 is substantially equal to the inside diameter of the hollow cylinder 10. Accordingly, the outside diameter of the ring 16 is larger than that of the insertable member 2. The inner periphery of the member 2 is adapted to the diameter of a cable to be inserted in a distribution switchboard. If the diameter of cable varies, an insertable member which merely has the inner periphery suitable to the diameter of cable is prepared. The mouth of the member 2 on the flange side is fitted with an easily removable blank cap 18 of a resilient plastic material that is connected to the member 2 by a thin wall 19. By pulling a center knob 20 outwardly, the cap is removed easily, and the mouth of the member 2 on the flange side opens. The clamper 3 is a U-shaped belt and legs 25, 26 extend from the belt wings 23, 24, respectively, of the main part of the belt 22. The leg 25 of the belt wing 23 has a tongue 27 at the root that extends along the inner periphery of the wing 23, and so, the inner surface of the tongue provides a curved extension of the inner surface of the wing 23. A recess 29 for receiving the tongue 27 is formed at the root of the leg 26 of the other belt wing 24. In FIG. 5, the numeral 30 indicates a bolt which is inserted through holes 31, 32 in the legs 25, 26 and fastened with a nut 33. The numeral 34 also indicates a nut which engages the male thread 9 of the tube 6.

Figures 6, 7:
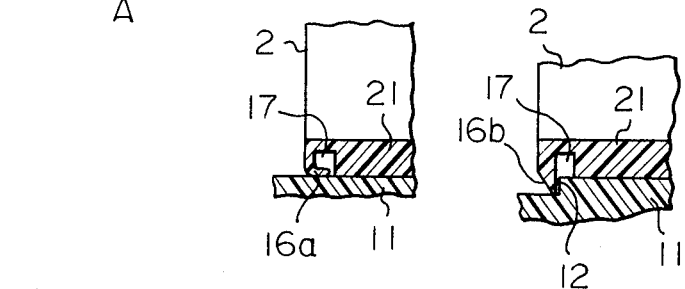
FIG. 6 is a partial section showing the relation between the insertable member and the hollow cylinder of the mounting body before they engage each other.
FIG. 7 is a partial section showing how the insertable member engages the hollow cylinder.

The cable holder of this invention is used by the following procedure: the insertable member 2 is inserted into the mounting body 1 through its smaller end (i.e. cylinder 11), with the ring 16 as leader. Since the outside diameter of the member 2 is equal to the inside diameter of the cylinder 11, the member 2 advances as its outer periphery slides along the inner periphery of the cylinder 11. Since the outside diameter of the ring 16 is larger than the inside diameter of the cylinder 11, the tip of the ring bends elastically toward the groove 17, as indicated by 16a in FIG. 6, during movement of the member 2. When the flange 15 reaches the mouth of the cylinder 11, the ring 16 disengages from the terminal end of the cylinder 11 and slides into the cylinder 10. Then, the ring 16 returns to the initial state resiliently and its axial inner periphery 16b contacts the step 12 as shown in FIG. 7. This prevents the member 2 from being pushed back to the mouth of the cylinder 11. Furthermore, because the flange 15 contacts the mouth of the cylinder 11, the member 2 no longer advances through the cylinder 10. In consequence, the member 2 is held in place within the cylinder 11. The belt 22 of the clamper 3 is put in the groove 13 and the legs 25, 26 are fastened with the bolt 30 and nut 33. The tip of the tube 6 of the so assembled cable holder is inserted through a hole made in the plate 40 of a panel board and is fastened to the inside surface of the plate with the nut 34. In this way, the holder is mounted in a position through which a cable is to be led in. In the arrangement described above, the mouth of the insertable member 2 on the flange side 15 is integrally fitted with the blank cap 18, so the holder can be left unused for a long time without permitting any dust or atmospheric moisture to enter the panel board box through a connection with the plate of the box.

A cable is held in place by the holder of this invention by the following procedure. (1) When the insertable member 2 having an inside diameter equal to the outside diameter of the cable A to be inserted is within the mounting body 1, the knob 20 is pulled outwardly to break the thin-walled connection 19. The bolt 30, is loosened and the cable A inserted in the insertable member 2, and the bolt 30 is tightened. (2) When the insertable member 2 within the mounting body 1 has an inside diameter that differs from the outside diameter of the cable A, the member 2 is pulled out of the mounting body. When the member 2 is pulled with a jerk, the tip of the ring 16 goes beyond the step 12 but acting against that step, it bends resiliently in a direction opposite to that indicated by 16a in FIG. 6. The member 2 is continued to be pulled until it is completely outside the mounting body 1. Then, insert an insertable member 2 having an inside diameter equal to the outside diameter of the cable. Before insertion, the blank cap 18 is preferably removed from the member 2. After the member 2 is inserted into the mounting body 1, the cable A is forced into the member 2 in the manner described in (1) and tightened with the bolt 30. (3) When the outside diameter of the cable is equal to that of the insertable member 2 in the mounting body 1, the member is removed from the mounting body and without inserting another insertable member, the cable A is immediately forced into the cylinder 11 and tightened with the bolt 30.

If the bolt 30 is tightened to bring the legs 25, 26 close to each other for the purpose of fixing the cable A to the mounting body either directly as in (3) or via the inserted member 2 as in (1) or (2), the width of the belt 22 and belt wings 23, 24 of the clamper 3 presses the length of the cylinder 11 to clamp the cable A either through the cylinder 11 or through the cylinder 11 and inserted member 2. As described above, the cylinder 11 is made of a resilient material such as flexible rubber or vinyl chloride resin, so when it is placed under external pressure, it has a tendency to deform in a direction where no pressure is applied. But in the cable holder of this invention, the tongue 27 is formed at the root of the leg 25 in such a manner that its inner surface 28 defines the inner peripheral extension of the wing 23, and the recess for receiving the tongue 27 is formed at the root of the leg 26. Therefore, when the legs 25, 26 come close to each other, the tongue 27 is received by the recess 29 as shown in FIG. 4, and the circumference of the cylinder 11 is pressed uniformly with the belt 22, belt wings 23, 24 and tongue 27, whereupon the circumference of the cable A or inserted member 2 is uniformly pressed for unit area. This eliminates any gap between the inner circumference of the cylinder 11 and the cable A or inserted member 2. When the cable A is within the inserted member 2, pressure applied through the member 2 eliminates a gap between the member and the cable A, thus assuring security from the entrance of dust or moisture into the distribution box through the connection between the cable holder and the cable A. As a further advantage, the length of the part of the cable A, that is effectively held in place with the clamper by pressure applied through the cylinder 11 or through both the cylinder 11 and inserted member 2, is equal to the width of the clamper and large enough to achieve the objects of this invention without applying more pressure in a unit length or area of the cable A. This eliminates the possibility of damaging the cable A by increased clamping pressure.

What is claimed is:

1. A cable holder comprising a mounting body provided with a hollow cylinder, an insertable member having a flange on one end which can be slid into the cylinder through the cable-receiving end of the cylinder up to the point of said flange, and a clamper for clamping the part of the mounting body through which the insertable member is to be slid, said insertable member and the inner surface of said cylinder being made of an electrically insulating, resilient plastic material, wherein the part of the cylinder through which the insertable member is to be slid has an inside diameter smaller than that of the other part of the cylinder, forming a step on the boundary of the two parts of the cylinder, the other end of the insertable member being provided with a ring and inwardly adjacent annular groove, the diameter of said ring being slightly larger than the outer diameter of the insertable member and being equal to the inside diameter of the larger part of the cylinder.

2. A cable holder as set forth in claim 1, wherein said clamper is a U-shaped belt which has legs in the respective belt wings for urging said belt against the outer periphery of said mounting body by means of a clamping bolt, one of the belt wings being provided, at the root of the leg, with a tongue the inner surface of which defines the inner peripheral extension of said belt wing, and the other belt wing having at the root of the leg a recess along the inner surface of the wing for receiving said tongue.

3. A cable holder as set forth in claim 1 wherein the mouth of the insertable member on the flange side is closed with an easily removable blank cap.

* * * * *